United States Patent
Kim

(10) Patent No.: US 7,573,791 B2
(45) Date of Patent: Aug. 11, 2009

(54) RECORDING MEDIUM, METHOD OF RECORDING IDENTIFICATION INFORMATION THEREOF, AND RECORDING/REPRODUCING METHOD THEREOF

(75) Inventor: Jin Yong Kim, Seongnam-si (KR)

(73) Assignee: LG Electronics Inc., Seoul (KR)

( * ) Notice: Subject to any disclaimer, the term of this patent is extended or adjusted under 35 U.S.C. 154(b) by 646 days.

(21) Appl. No.: 10/918,471

(22) Filed: Aug. 16, 2004

(65) Prior Publication Data

US 2005/0036417 A1  Feb. 17, 2005

(30) Foreign Application Priority Data

Aug. 14, 2003  (KR) .................... 10-2003-0056541

(51) Int. Cl.
*G11B 7/00* (2006.01)
(52) U.S. Cl. .................................. 369/47.21
(58) Field of Classification Search ........... None
See application file for complete search history.

(56) References Cited

U.S. PATENT DOCUMENTS

| 5,886,961 | A | * | 3/1999 | Yamashita et al. ......... 369/30.3 |
| 6,320,840 | B1 | * | 11/2001 | Oh et al. ..................... 369/286 |
| 6,356,515 | B1 | * | 3/2002 | Kumita et al. ............ 369/13.26 |
| 6,381,203 | B1 | * | 4/2002 | Muramatsu .............. 369/47.17 |
| 6,877,165 | B1 | * | 4/2005 | Aoki .......................... 720/710 |
| 2003/0063530 | A1 | | 4/2003 | Takehara et al. |

FOREIGN PATENT DOCUMENTS

| EP | 0 883 115 | | 12/1998 |
| EP | 1 229 527 | | 8/2002 |
| EP | 1 258 872 | | 11/2002 |
| EP | 1 291 874 | A2 | 3/2003 |
| JP | 11-162017 | | 6/1999 |

* cited by examiner

*Primary Examiner*—Joseph Feild
*Assistant Examiner*—Joseph Haley
(74) *Attorney, Agent, or Firm*—Harness, Dickey & Pierce

(57) ABSTRACT

The present invention provides a method of recording identification information in an optical disc, by which specified disc identification information can be uniformly applicable to efficiently cope with the recording/reproducing of the optical disc. The present invention includes the step of recording disc identification information in a management area of the optical disc wherein the disc identification information identifies a disc type identified according to a disc thickness.

22 Claims, 9 Drawing Sheets

RECORDING MEDIUM, METHOD OF RECORDING IDENTIFICATION INFORMATION THEREOF, AND RECORDING/REPRODUCING METHOD THEREOF

This application claims the benefit of the Korean Application No. 10-2003-0056541 filed on Aug. 14, 2003, which is hereby incorporated by reference.

BACKGROUND OF THE INVENTION

1. Field of the Invention

The present invention relates to a record medium, and more particularly, to a method of recording disc identification information within a management area of a recordable optical disc and an optical disc recording/reproducing method using the same.

2. Discussion of the Related Art

A high density optical recording medium, known as HD-DVD, is widely used to record and store high-definition video data and high-quality audio data. The Blu-ray disc represents next-generation HD-DVD technology.

Technological specifications are now being established for the global standardization of the Blu-ray disc, including standards are for the write-once Blu-ray disc (BD-WO). Meanwhile, a rewritable Blu-ray disc, known as the 1×-speed BD-RE and now being discussed, should be compatible with BD-RE discs expected to have higher recording velocities, i.e., the 2×-speed BD-RE and beyond. BD-WO specifications for high recording velocity are also in progress. Efficient solutions for coping with the high recording velocity of a high-density optical disc are urgently needed, and the specifications established should ensure mutual compatibility.

A disc manufacturer manufacturing read-only or recordable optical discs needs to inform a user of a type of the disc correctly, whereby the user confirms an optimal recording/reproducing condition fitting the disc type to utilize in recording/reproducing.

Therefore, it is necessary to provide a user with information about various disc types as disc identification information according to specified formats.

SUMMARY OF THE INVENTION

Accordingly, the present invention is directed to a method of recording disc identification information in an optical disc that substantially obviates one or more problems due to limitations and disadvantages of the related art.

An object of the present invention is to provide a new method of recording disc identification information as specified information, by which recording/reproducing of an optical disc is efficiently performed from the recorded disc identification information.

Another object of the present invention is to provide a specified method of recording disc type information according to a disc thickness in a specific area within a disc, by which reciprocal compatibility is provided between the discs of the family series.

A further object of the present invention is to provide a recording/reproducing method and apparatus thereof, by which data is efficiently recorded/reproduced on/from an optical disc using the recorded disc identification information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of recording an identification information in a recording medium includes the step of recording an identification information in the recording medium, wherein the identification information identifies a type of recording medium identified according to a thickness of the recording medium.

In another aspect of the present invention, a method of recording an identification information in an optical disc includes the step of recording a disc identification information in a management area of the optical disc wherein the disc identification information identifies a disc type identified according to whether the optical disc has a collision preventing function or not.

In another aspect of the present invention, a recording medium includes a management area including an identification information, the identification information identifies a medium type identified according to a thickness; and a data area.

In another aspect of the present invention, An optical disc includes a management area; and a data area, wherein an area for recording a disc identification information therein is provided to the management area and wherein the disc identification information identifies a disc type identified according to whether the optical disc has a collision preventing function or not.

In another aspect of the present invention, a recording/reproducing method in a recording medium includes the steps of reading an identification information identifying a medium type associated with a thickness from a specific area of the recording medium; and performing an initial setup fitting a recording/reproducing of the corresponding recording medium from the identified medium type.

In another aspect of the present invention, a method for recording or reproducing data on or from a recording medium includes the steps of identifying a type of a recording medium based on an identification information recorded in a specific area of the recording medium, the identification information identifying the recording medium type with respect to a thickness; and controlling a servo operation as a result of the identifying step.

In another aspect of the present invention, a recording/reproducing apparatus for an optical disc includes a control unit delivering a recording command; and a recording/reproducing unit receiving the recording command, the recording/reproducing unit performing a recording according to the recording command in a manner of reading a disc identification information recorded in a management area of the optical disc and checking a disc type associated with a disc thickness to perform the recording at a servo circumstance decided by the checked disc type.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. For convenience of explanation, a Blu-ray disc (BD) is taken as an example of an optical disc according to the present invention. Yet, it is apparent that the concept of the present invention, which is characterized in an optical disc having its disc control information recorded thereon, is applicable to read-only DVD (DVD-ROM) and recordable DVD (DVD-RAM/–RW/+RW/–R/+R) and the like for example in the same manner.

Besides, although terms used in the present invention are possibly selected from the currently well-known ones, some terms are arbitrarily chosen by the applicant in some cases so that their meanings are explained in detail in the following description. Hence, the present invention should be understood with the intended meanings of the corresponding terms chosen by the applicant instead of the simple names or meanings of the terms themselves.

First of all, 'disc identification information' used in the description of the present invention means the information distinguishing a specific disc from other discs. As various discs show up lately, informations enabling to identify them, respectively are needed. Specifically, the present invention is characterized in identifying a disc type according to a disc thickness.

Disc types applicable to the present invention are exemplarily explained in detail by referring to FIG. 1 and FIG. 2 as follows.

Figure 1:
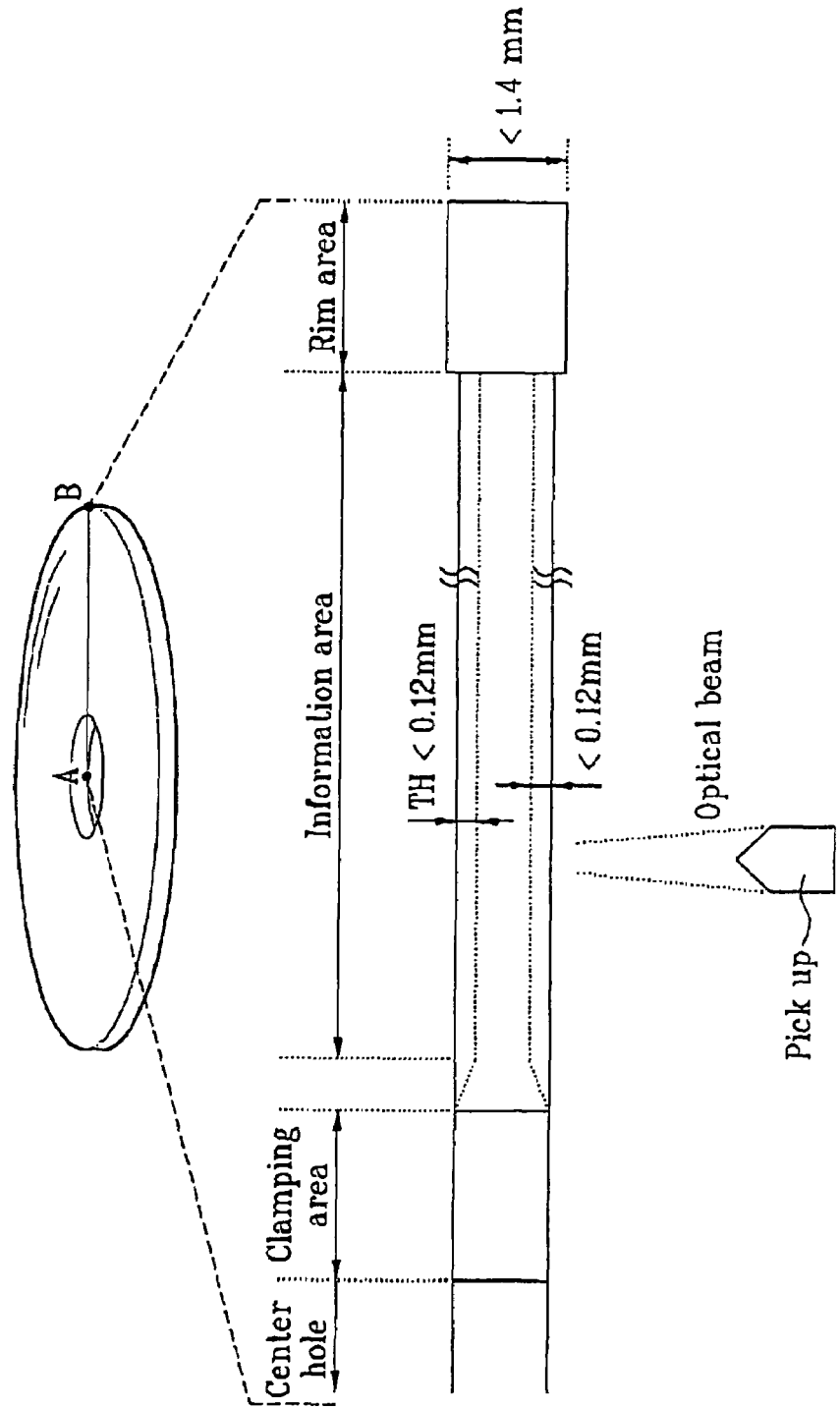
FIG. 1 is a structural diagram of a first disc type for describing the present invention.

FIG. 1 shows a conventional disc type, which is named 'type-1 disc'.

For convenience of explanation, looking into a cross-section of the type-1 disc along a solid line from its center to outer circumference, the type-1 disc is divided into a clamping area, information area, and rim area from its inner circumference. The clamping area, which in a most inner circumference of the disc, comes into contact with a clamper (not shown in the drawing) of a recording/reproducing apparatus (FIG. 8) to fix the disc thereto when the disc is loaded in the apparatus. The rim area, which lies in a most outer circumference of the disc, is formed thicker than other areas to maintain overall rigidity of the disc. And, the information area, which lies between the clamping and rim areas, is provided to substantially record valid information within the disc.

In case of BD, the disc thickness including the rim area is specified not to exceed 1.4 mm in any section of the disc and the information area is about 1.2 mm thick in general. Yet, an error may occur in thickness of the information area on manufacturing the disc, and the corresponding allowable error is decided in a manner that a step difference TH between the clamping area and the information area maintains maximum 0.12 mm.

The error is generated from manufacturing a disc in a following manner. First of all, each of the clamping and rim areas is formed of a single material, thereby having less chance of error occurrence. Yet, the information area includes a plurality of layers (not shown in the drawing) such as a cover layer, recording layer, substrate, and the like. And, the layers are formed of separate materials, respectively. Hence, one information area is prepared by forming each layer, whereby the error occurrence is inevitable. In case of exceeding the allowable error, the corresponding disc becomes unusable.

Figure 2:
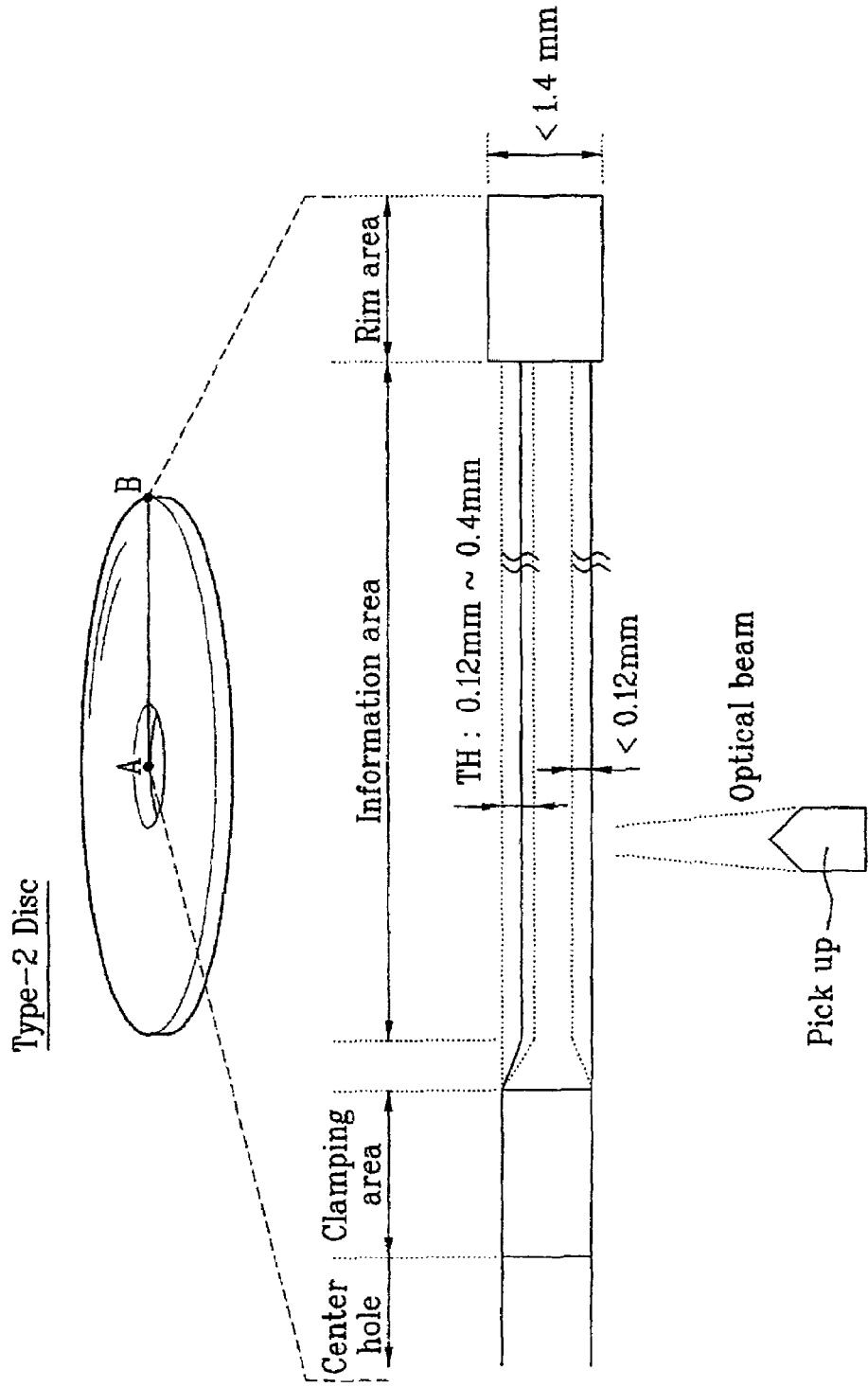
FIG. 2 is a structural diagram of a second disc type for describing the present invention.

FIG. 2 shows a disc type applicable to the present invention, which is named 'type-1 disc'.

Like the type-1 disc, the type-2 disc is divided into a clamping area, information area, and rim area from its inner circumference. The clamping area, which in a most inner circumference of the disc, comes into contact with a clamper (not shown in the drawing) of a recording/reproducing apparatus (FIG. 8) to fix the disc thereto when the disc is loaded in the apparatus. The rim area, which lies in a most outer circumference of the disc, is formed thicker than other areas to maintain overall rigidity of the disc. And, the information area, which lies between the clamping and rim areas, is provided to substantially record valid information within the disc.

And, the disc thickness including the rim area is specified not to exceed 1.4 mm in any section of the disc and the information area is about 1.2 mm thick in general.

Yet, like the type-1 disc in FIG. 1, one step difference TH between a lower clamping area and the information area maintains maximum 0.12 mm. Yet, in case of the type-2 disc in FIG. 2, the other step difference TH between an upper clamping area and the information area is different from that of the type-1 disc in FIG. 1 in order to achieve a special purpose.

Namely, the type-2 disc has a step difference margin of minimum 0.12 mm to maximum 0.40 mm. Compared to the type-1 disc in FIG. 1, the type-2 disc in FIG. 2 has the information area differ in thickness. Hence, the entire information area of the type-2 disc is thinner than that of the type-1 disc.

The 'upper' clamping area, which is introduced for the convenience of explaining the embodiment according to the present invention, means an area located to an opposite side to a pickup emitting an optical beam within the recording/reproducing apparatus (FIG. 8) when the corresponding disc is normally loaded in the apparatus. And, the 'lower' clamping area means an area located in an incident direction of the optical beam. Hence, an 'upper' or 'lower' information can be used for representation, accordingly.

In the type-2 disc, the area having the upper information area formed thereon is made lower than the upper clamping area to prevent collision between the pickup and the disc when the disc is incorrectly loaded. Specifically, such a disc may be named 'collision-free disc'.

Hence, the type-1 disc in FIG. 1 fails to be equipped with the function of preventing the collision between the pickup and the disc, which can be named 'non-collision-free disc'.

In case of BD, a recording layer for recording data therein is about 0.1 mm high above the lower area. Hence, if the 'non-collision-free disc' such as the type-1 disc is turned upside down to be loaded in the recording/reproducing apparatus (FIG. 8), a pickup performs a focusing servo control to find a reflective signal from the recording layer but to collide with a surface of the disc since the recording layer lies on an opposite side.

Yet, in case of the 'collision-free disc' in FIG. 2, even if the disc is incorrectly inserted to be turned upside down, the pickup avoids colliding with a surface of the disc despite ascending over a predetermined height via focusing servo since the upper information area is recessed in the range of a specific step difference.

As mentioned in the foregoing description, different disc types enable to exist for various causes and purposes despite having the same specifications. Hence, by previously recording information for identifying various disc types in a disc management area, the present invention enables a recording/reproducing unit ('10' in FIG. 8) to smoothly perform the corresponding recording/reproducing by referring to the recorded information.

Namely, the present invention intends to identify a disc type according to a disc thickness difference due to various causes as well as whether a disc type is 'collision-free disc' or 'non-collision-free disc'.

Specifically, the disc type is identified according to disc thickness because disc weight varies according to the corresponding disc thickness to have great influence on RPM of the disc. More limitation is put on a maximum RPM of a thin disc than is put on that of a thick disc, whereby the maximum RPM is differently set up according to each disc type.

Figure 3:
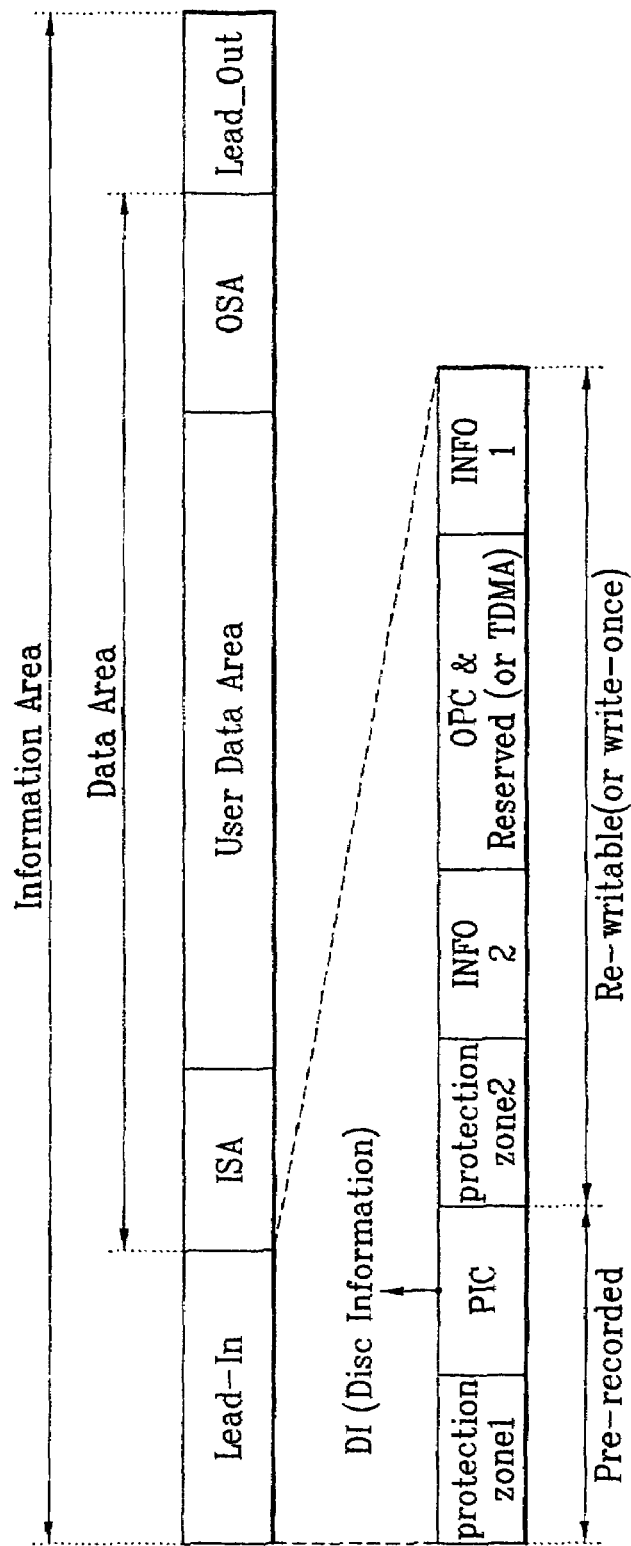
FIG. 3 is a diagram of a single-layer disc applicable to the present invention.
Figure 4:
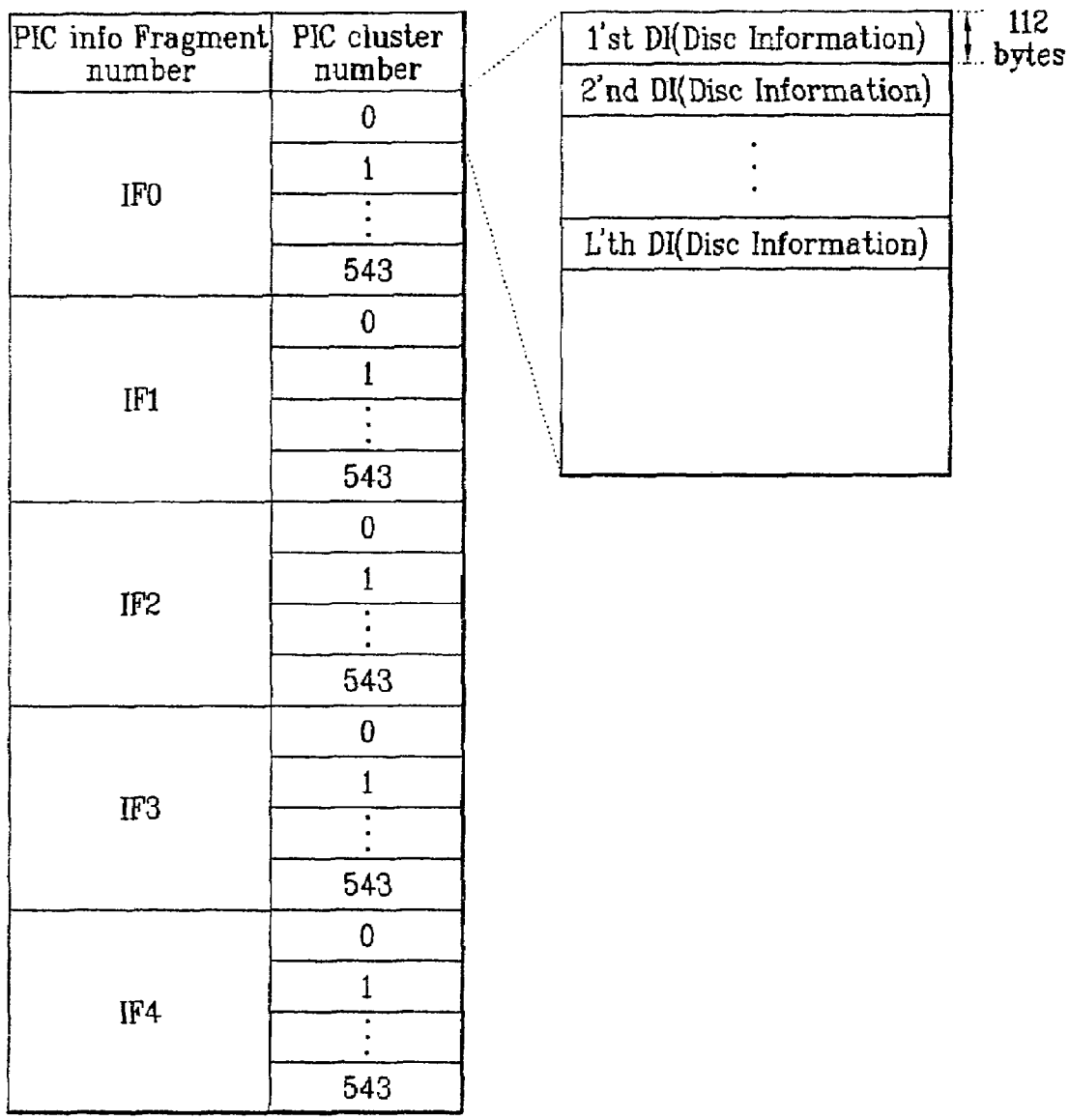
FIG. 4 is a diagram of a management area, in which disc identification information of the present invention is recorded.

FIG. 3 and FIG. 4 are structural diagrams of an optical disc according to the present invention, in which a read-only disc or recordable optical disc, i.e., rewritable or write-once optical disc is enough to be the optical disc applicable to the present invention. For convenience of explanation, the recordable Blu-ray disc (BD) is taken as an example in the following description of the present invention.

FIG. 3 is a structural diagram of a single-layer disc having one recording layer according to the present invention.

Referring to FIG. 1, a lead-in area is provided as a management area on an inner circumference area of an optical disc, whereas a lead-out area is provided as a management area on an outer circumference area of the optical disc. Specifically, the inner circumference area of the optical disc is divided into a prerecorded area and a rewritable or write-once area.

The prerecorded area is an area where data was already written in the course of manufacturing the disc, whereby a user or system is unable to perform data writing on the prerecorded area at all. In BD-RE/WO, the prerecorded area is named PIC (permanent information and control data) area. And, disc information (hereinafter called 'DI') as information required for disc recording is recorded in the PIC area.

In a data area, provided are a user data area where user's real data is recorded and spare areas ISA and OSA to replace a generated defect area. Specifically, TDMA (temporary defect management area) for recording information of defect and general managements is provided to such a write-once optical disc as BD-WO. In case of the rewritable BD (BD-RE), TDMA is unnecessary so that such an area is left as a reserved area.

In the description of the present invention, 'disc information' means an area or information including various information for disc recording/reproducing. And, the disc information is a general name of the information within a prerecorded or embossed area to be provided to a disc user by a disc manufacturer. Yet, the disc information is provided not only to the prerecorded area but also to a recordable area according to a user's request. And, the disc information within the prerecorded or embossed area can be copied to the recordable area as well, for example.

Moreover, the 'disc information' applicable to the BD may be called 'physical format information' in DVD-ROM/-RAM/–RW/+RW/–R/+R, and the like.

Hence, it is apparent that the technical background of the present invention be identically applicable to 'physical format information' in DVD-ROM/-RAM/–RW/+RW/–R/+R. For convenience of explanation, 'disc information (hereinafter abbreviated DI)' corresponding to a case of Blu-ray disc (BD) is taken as an example in the following description of the present invention.

The present invention intends to record various identification information identifying a disc type according to disc thickness in a prerecorded. Since management information recorded in the prerecorded area is always read out to be taken into consideration for recording or reproducing. Hence, the prerecorded area is optimal to providing new disc identification information as specified information.

Specifically, in case of BD-RE/WO, the PIC area as the prerecorded area is recorded by biphased high-frequency modulated signals, the high-frequency modulated signals in the corresponding area are played back according to a specific playback method, and information is acquired from the corresponding playback. Yet, it is a matter of course that a recording method in the prerecorded area should be differently applied according to the corresponding disc specification, e.g., DVD specification, CD specification, etc.

FIG. 4 is a structural diagram of a PIC area in the disc shown in FIG. 3. As mentioned in the foregoing description, it means that information can be rearranged like the structure of the PIC area in FIG. 4 when the entire information within the high-frequency modulated PIC area is acquired.

A method of configuring disc information (DI) in the PIC area is explained in detail as follows.

In BD-RE/WO, 'one cluster' represents a minimum recording unit, five hundred forty-four clusters gather to construct one fragment as one upper recording unit, and total five fragments gather to form the PIC area. Disc information is recorded in a front head cluster of a first fragment IF0. The disc information is plurally recorded per recording layer and writing speed applicable by the corresponding optical disc, and one disc information includes one hundred twelve bytes. Specifically, disc information constructed with 112-bytes is called a disc information (DI) frame. Moreover, the same contents of the disc information are repeatedly recorded in each front head cluster of the rest fragments, thereby enabling to cope with loss of the disc information.

Information representing the corresponding recording layer, information representing writing speed, and write strategy information coping with the writing speed are recorded within the disc information each. Moreover, disc type identification information is recorded within the disc information as well. Hence, by utilizing such information in the recording or reproducing of the corresponding optical disc, it is able to provide optimal write power per disc type and per writing speed.

Various embodiments for a method of recording identification information including disc type information within the disc information according to the present invention is explained in detail by referring to FIGS. 5 to 9 as follows.

Figure 5:
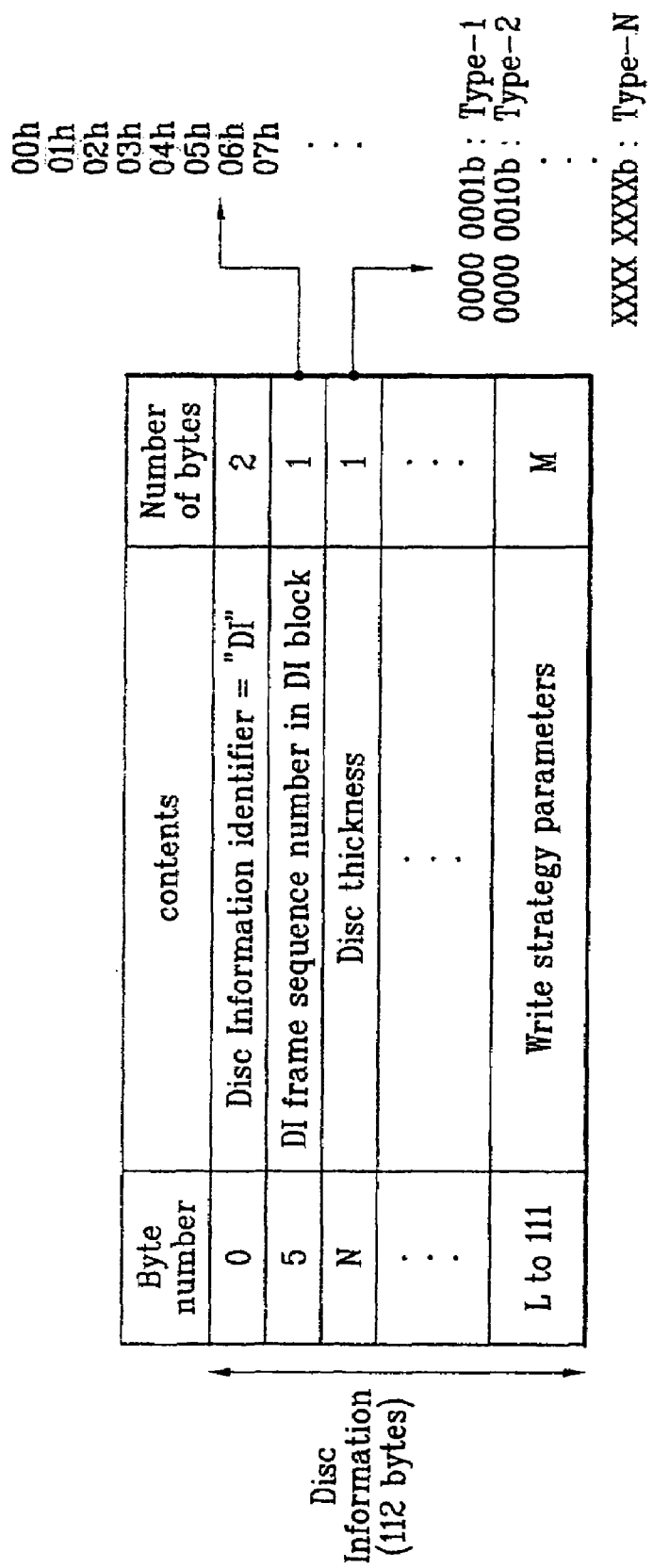
FIG. 5 is a diagram of recording disc identification information according to one embodiment of the present invention.

FIG. 5 is a diagram of recording disc identification information according to one embodiment of the present invention.

Referring to FIG. 5, a plurality of disc informations are recorded within a disc, a sequence number is given to each of the disc informations to decide a sequence order, and the sequence order is recorded by 1-byte. For instance, the corresponding information is recorded in $5^{th}$ byte within the disc information, which is named 'DI frame sequence number in DI block' field and is briefly indicated by '00h, 01h, 02h, 03h . . . '. Namely, if the information of the $5^{th}$ byte is '00h', it means $1^{st}$ disc information. And, if the information of the $5^{th}$ byte is '07h', it means $8^{th}$ disc information.

And, a write strategy (WS) interoperating with the speed meant by the corresponding disc information is recorded in a specific area, which is named 'Write Strategy parameters' field by $L^{th}$~$111^{th}$ bytes, within the disc information. Moreover, identification information enabling to identify a disc type depending on disc thickness is recorded in another specific area, which is named 'DI Type' field by $N^{th}$ byte, within the disc information.

If there exist 'N' disc types, the identification information allocates a specific recognition value to each of the disc types. For instance, if '0000 0001b', the specific recognition value means a first disc type Type-1. If '0000 0010b', the specific recognition value means a second disc type Type-2. And, if 'XXXX XXXXb' according to a value of 'N', the specific recognition value means an $N^{th}$ disc type Type-N.

Hence, it is able to record various disc types interoperating with disc thickness within the disc information by specified information. It is apparent that the disc types Type-1, Type-2, . . . Type-N in FIG. 5, which are conceptionally illustrated for a general case, include the type-1 and type-2 discs in FIG. 1 and FIG. 2.

Figure 6:
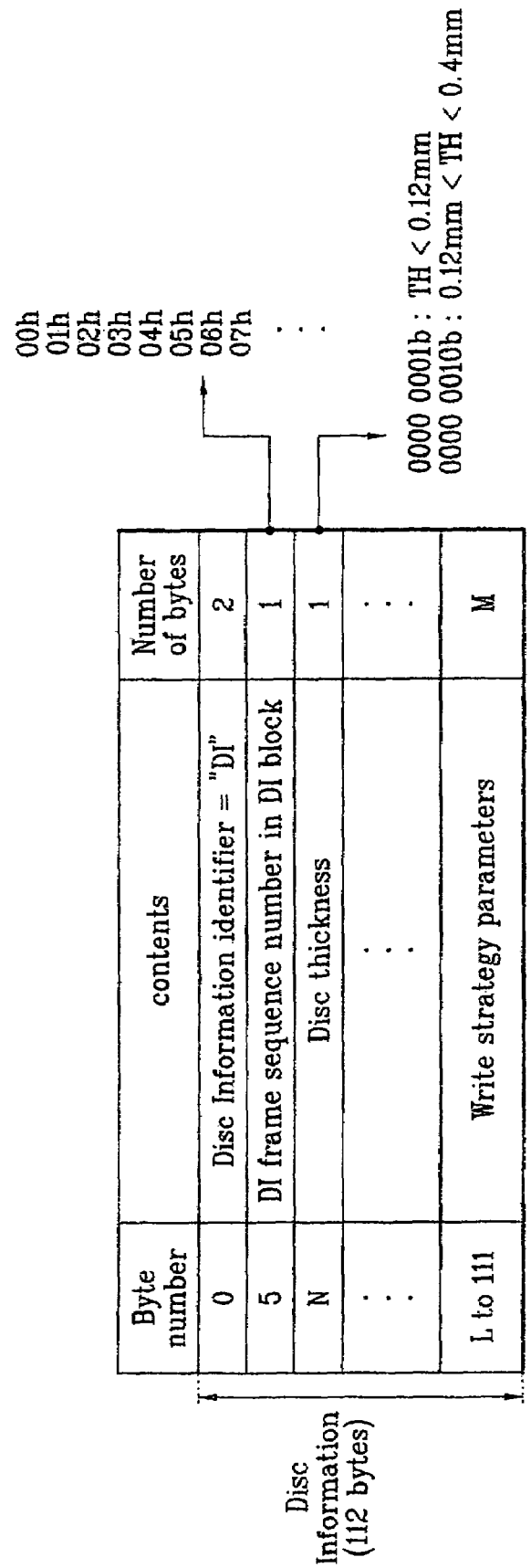
FIG. 6 is a diagram of recording disc identification information according to another embodiment of the present invention.

FIG. 6 is a diagram of recording disc identification information according to another embodiment of the present invention, in which a disc type is identified using a step difference TH between a clamping area and an area having an information area formed thereon like FIG. 1 and FIG. 2.

Referring to FIG. 6, it can be defined in the following manner. If 'Disc thickness' field in $N^{th}$ byte of disc information is '0000 0001b', it means a disc having the step difference TH equal to or smaller than 0.12 mm. If 'Disc thickness' field in $N^{th}$ byte of disc information is '0000 0010b', it means a disc having the step difference TH greater than minimum 0.12 and smaller than maximum 0.4 mm.

Hence, by subdividing the step difference TH further, it is able to indicate the disc types. In doing so, new identification information is added to the $N^{th}$ byte. Besides, $5^{th}$ and $Lth$~$111^{th}$ bytes correspond to those in FIG. 5, of which explanation is skipped.

Figure 7:
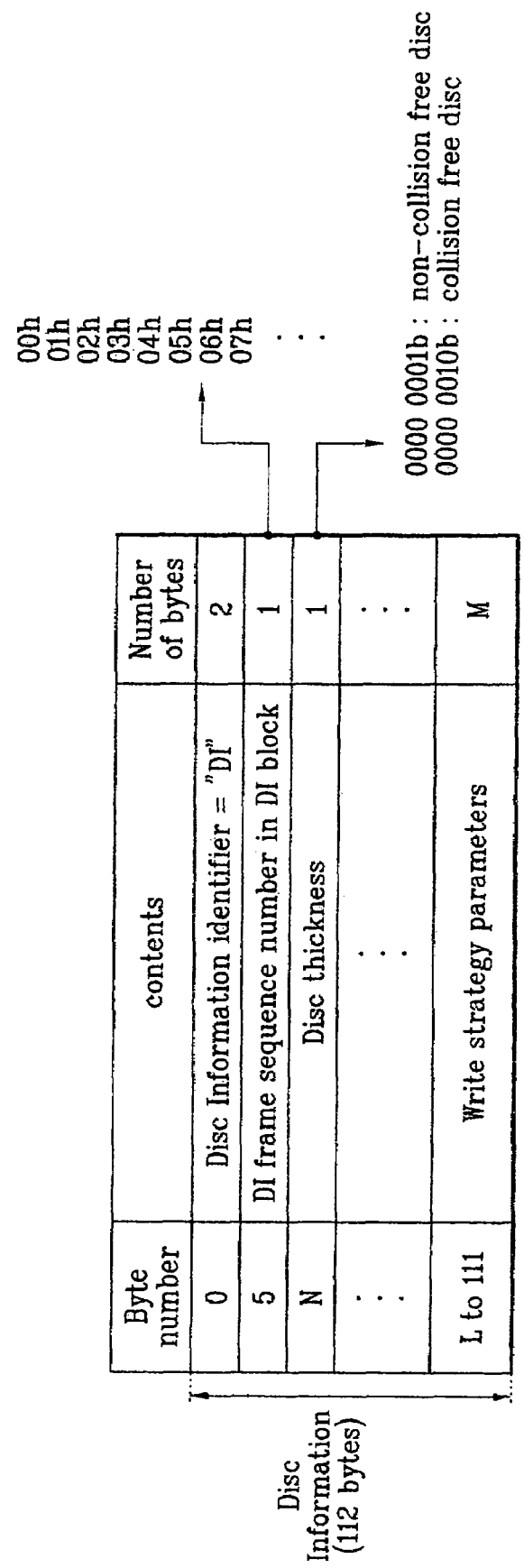
FIG. 7 is a diagram of recording disc identification information according to a further embodiment of the present invention.

FIG. 7 is a diagram of recording disc identification information according to a further embodiment of the present invention, in which a disc is identified according to presence or non-presence of a collision preventing function in BD as described in FIG. 1 and FIG. 2.

Referring to FIG. 7, it can be defined in the following manner. If 'Disc thickness' field in $N^{th}$ byte of disc information is '0000 0001b', it means 'non-collision-free disc' failing to have the collision preventing function. If 'Disc thickness' field in $N^{th}$ byte of disc information is '0000 0010b', it means 'collision-free disc' having the collision preventing function.

Hence, as described in FIGS. 5 to 7, disc type information interoperating with disc thickness can be recorded within disc information in various ways. And, a recording/reproducing method and apparatus of an optical disc using the above-recorded disc information are explained in the following description of FIG. 8 and FIG. 9.

Figure 8:
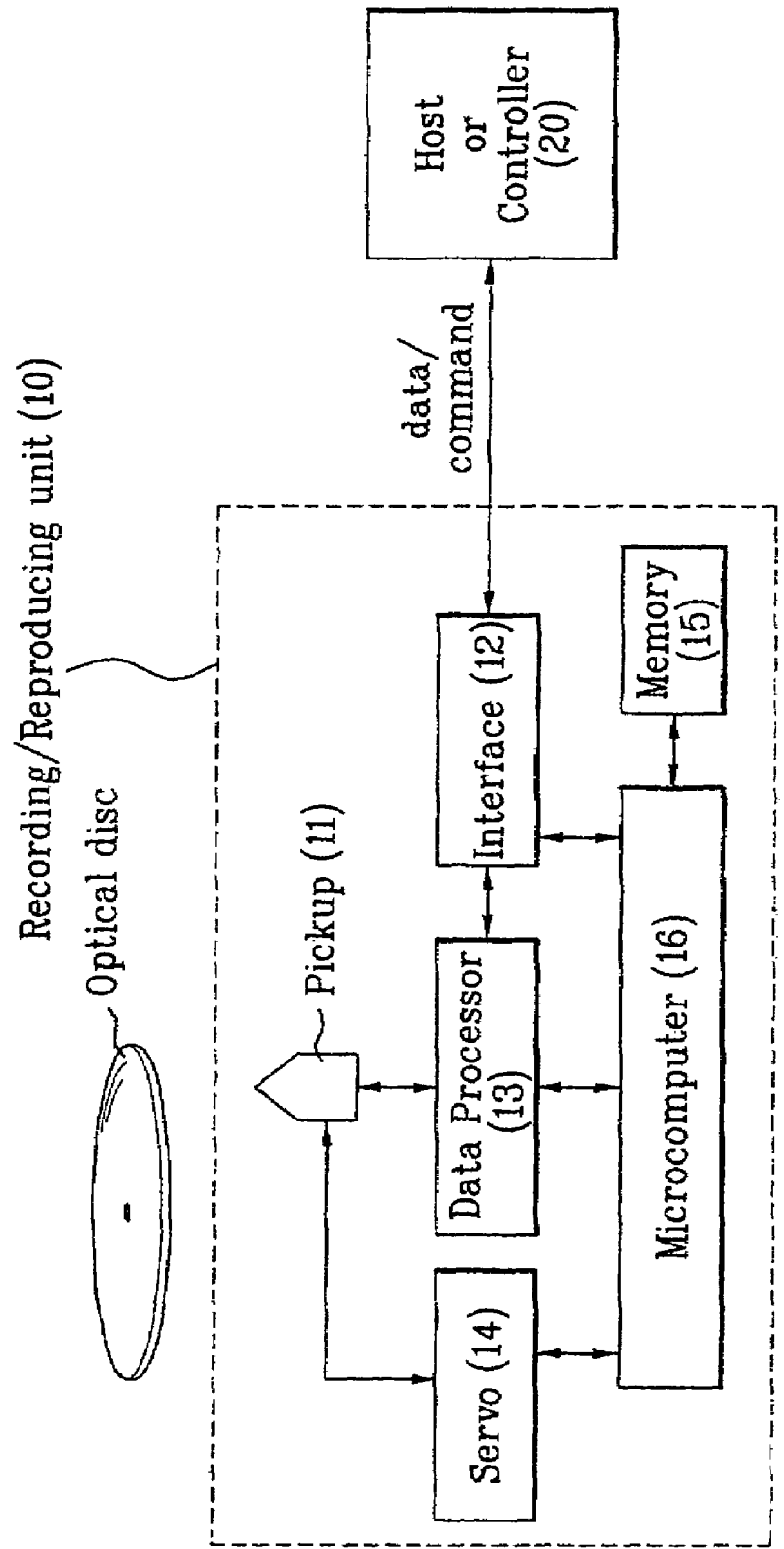
FIG. 8 is a block diagram of an optical disc recording/reproducing apparatus applicable to the present invention.

FIG. 8 is a block diagram of an optical disc recording/reproducing apparatus applicable to the present invention.

Referring to FIG. 8, a recording/reproducing apparatus according to the present invention includes a recording/reproducing unit 10 carrying out recording/reproducing on an optical disc and a control unit 20 controlling the recording/reproducing unit 10.

The control unit 20 gives a recording or reproducing command for a specific area, and the recording/reproducing unit 10 carries out the recording/reproducing on the specific area according to the command of the control unit 20. Besides, in case that the apparatus fails to include the control unit 20, it is able to design the apparatus in a manner that a microcomputer 16 enables to perform the functions of the control unit 20.

Figure 9:
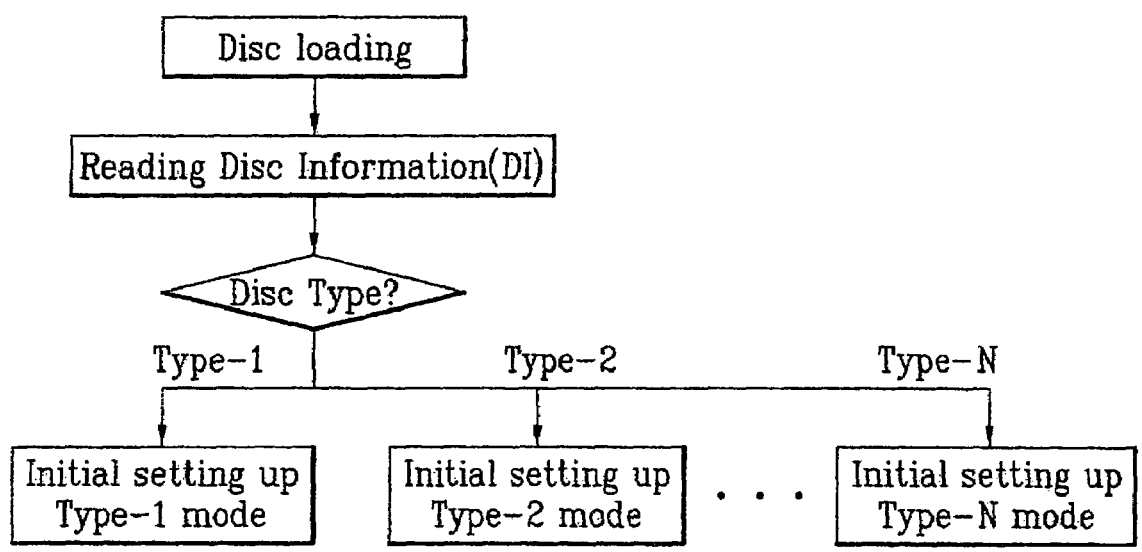
FIG. 9 is a flowchart of a recording method using disc identification information according to the present invention.

A recording/reproducing process of an optical disc according to the present invention is explained in detail by referring to FIG. 8 and FIG. 9 as follows.

First of all, once an optical disc is loaded in the recording/reproducing apparatus, the entire disc management information within the disc is read out to be temporarily stored in a memory 15 of the recording/reproducing unit 10. And, various kinds of the disc management information are utilized for the recording/reproducing of the optical disc. Specifically, the management information stored in the memory includes the disc information of the present invention, whereby the disc type information recorded within the disc information is read out to be stored in the memory as well. Moreover, the disc type information interoperates with disc thickness. Once a disc type is determined, initialization of recording/reproducing environment fitting the corresponding disc type is executed.

Namely, as disc thickness differs, disc weight varies to affect disc's rotation number, i.e., RPM. Hence, more limitation is put on a maximum RPM of a thin disc than is put on that of a thick disc. By taking such a fact into consideration, the initialization can be executed in a manner that the maximum RPM is differently set up according to each disc type.

For instance, once the thin disc Type-2 is loaded, the microcomputer 16 previously sets up the maximum RPM of the corresponding disc and then utilizes it in controlling a servo 14 and the like.

Thus, after completion of the initial setup per disc type, the recording/reproducing unit 10 performs the recording/reproducing according to the recording/reproducing command of the control unit 20. Specifically, in performing the recording, the recording/reproducing unit 10 refers to the disc type, i.e., maximum RPM initially set per disc type according to disc thickness, and WS within the disc information to enable the more efficient recording.

Accordingly, the present invention provides the various specified methods of recording disc identification information according to disc thickness in a management area of a high-density optical disc thereby enabling to efficiently cope with the recording/reproducing of the optical disc by utilizing the recorded identification information.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A recording/reproducing method in a recording medium, comprising the steps of: reading an identification information of the recording medium, the recording medium classified into at least a first medium type and a second medium type, with the first medium type and the second medium type classified by a thickness of an information area of the recording medium, the identification information identifying one of the first medium and second medium types, where the first and second medium types of the recording medium are supported by an optical pickup including a light beam having a same applicable wavelength range, and the first and second medium types are applied to a same standard of the recording medium, and the thickness of the information area is different than a thickness of a clamping area; and performing an initial setup for recording/reproducing of the corresponding recording medium based on the identified medium type.

2. The recording/reproducing method of claim 1, wherein the initial setup is to decide a rotation number fitting a thickness of the corresponding recording medium according to the identified medium type.

3. The recording/reproducing method of claim 2, wherein the rotation number is RPM, the initial setup is set to a maximum RPM according to the thickness.

4. The recording/reproducing method of claim 1, wherein the identification information for identifying the medium type associated with the disc thickness identifies a collision-free medium and a non-collision-free medium.

5. The recording/reproducing method of claim 4, wherein the collision-free medium is thinner than the non-collision-free medium.

6. A method for recording or reproducing data on or from a recording medium, comprising the steps of: identifying identification information recorded in a specific area of the recording medium, the recording medium classified into at least a first medium type and a second medium type, with the first medium type and the second medium type classified by a thickness of an information area of the recording medium, the identification information identifying one of the recording first and second medium types, where the first and second medium types of the recording medium are supported by an optical pickup including a light beam having a same applicable wavelength range, the first and second medium types are applied to a same standard of the recording medium, and the thickness of the information area is different than a thickness of a clamping area; and controlling a servo operation as a result of the identifying step.

7. The method of claim 6, wherein the identification information identifies whether the recording medium is conventional type having a thickness or new type having a thickness thinner than the conventional type.

8. The method of claim 7, wherein the controlling step controls a servo operation to rotate the recording medium based on the result of the identifying step.

9. The method of claim 7, wherein the controlling step controls a servo operation to focus the recording medium based on the result of the identifying step.

10. The method of claim 6, wherein the identification information identifies whether the recording medium is non-collision-free type having a thickness or collision-free type having a thickness thinner than the non-collision-free type.

11. A recording/reproducing apparatus for an optical disc, comprising: an optical pickup configured to record or reproduce data on or from the optical disc, the optical disc classified into at least a first disc type and a second disc type, with the first disc type and the second disc type classified by a thickness of an information area of the optical disc, where the first and second disc types of the optical disc are supported by the optical pickup including a light beam having a same applicable wavelength range; and a control unit operatively coupled to the optical pickup, configured to identify one of the first and second disc types based on disc identification information, and configured to control the optical pickup to record or reproduce data at a servo circumstance decided by the identified disc type, where the first and second disc types are applied to a same standard of the optical disc, and the thickness of the information area is different than a thickness of a clamping area.

12. The recording/reproducing apparatus of claim 11, wherein the control unit is configured to identify the disc type with respect to the disc thickness being classified by one of a collision free disc and a non-collision free disc.

13. The recording/reproducing apparatus of claim 12, wherein the collision free disc is thinner than the non-collision free disc.

14. The method of claim 1, wherein the identification information is stored in a management area.

15. The method of claim 1, wherein the thickness corresponds to a thickness of an information area within the recording medium.

16. The method of claim 15, wherein the thickness of the information area within the recording medium is identified by a step between a clamping area and the information area.

17. The method of claim 1, further comprising:
determining a location of a recording layer to record/reproduce data on or from the recording medium.

18. The method of claim 6, further comprising:
determining a location of a recording layer to record or reproduce data on or from the recording medium.

19. The recording/reproducing apparatus of claim 11, wherein the optical pickup is configured to read the disc identification information recorded in a management area of the optical disc, and the control unit is configured to identify the disc type based on the read disc identification information.

20. The recording/reproducing apparatus of claim 11, further comprising:
a memory configured to store the disc identification information in a management area, and wherein
the control unit is configured to read the disc identification information stored in the memory to identify the disc type.

21. The recording/reproducing apparatus of claim 11, further comprising:
a servo, operatively coupled to the optical pickup, configured to control a servo operation of the optical pickup according to a writing speed.

22. The recording/reproducing apparatus of claim 11, wherein the control unit is configured to determine a location of a recording layer of the optical disc to record or reproduce the data on or from the optical disc.

* * * * *